Sept. 18, 1951           A. J. LEWUS           2,568,076
POWER TAKE-OFF APPARATUS FOR MOTOR VEHICLES
Filed Dec. 30, 1946           2 Sheets-Sheet 1
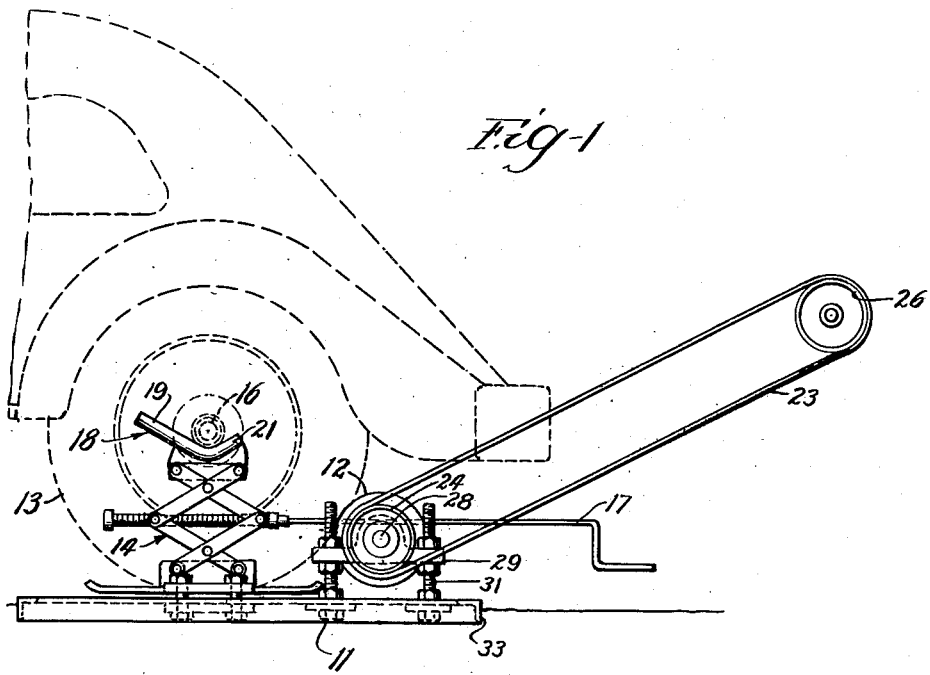
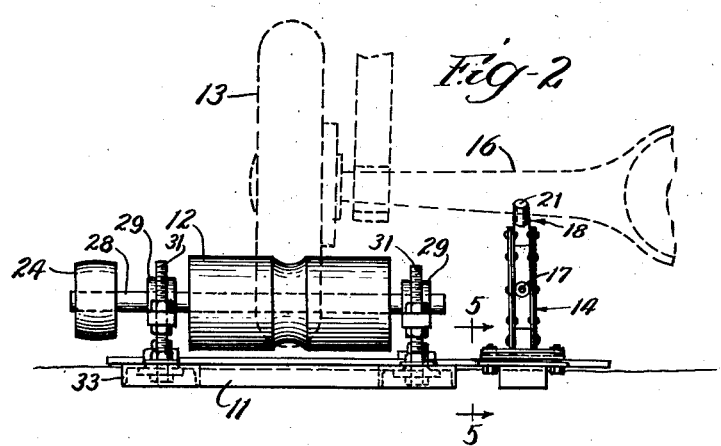

Sept. 18, 1951  A. J. LEWUS  2,568,076
POWER TAKE-OFF APPARATUS FOR MOTOR VEHICLES
Filed Dec. 30, 1946  2 Sheets-Sheet 2
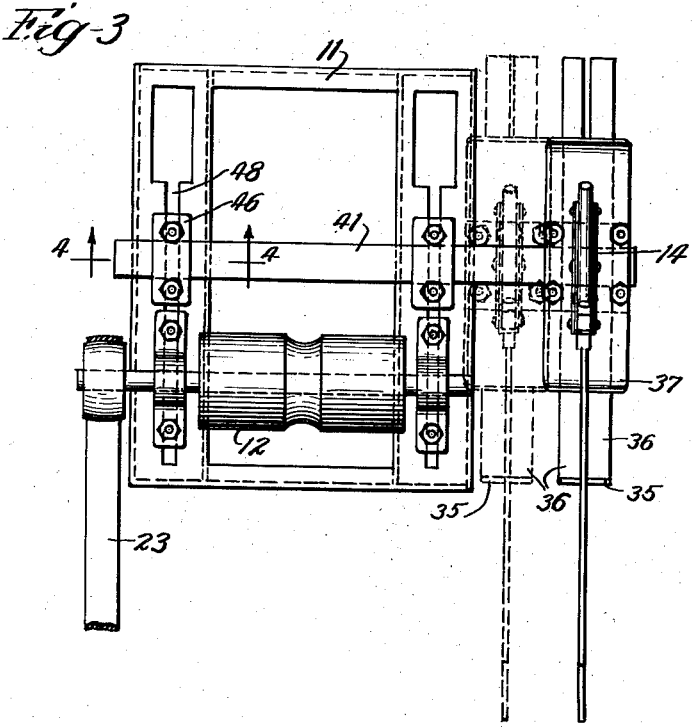
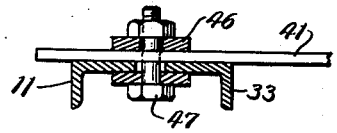
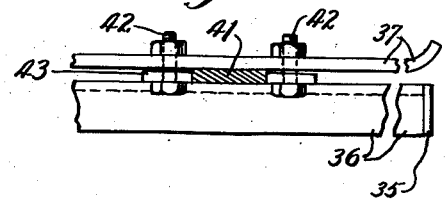
Inventor.
Alexander J. Lewus.
By:- Louis Robertson, Atty.

Patented Sept. 18, 1951

2,568,076

UNITED STATES PATENT OFFICE 2,568,076

POWER TAKE-OFF APPARATUS FOR MOTOR VEHICLES

Alexander Jay Lewus, Cicero, Ill.

Application December 30, 1946, Serial No. 719,188

6 Claims. (Cl. 74—13)

There are frequent occasions, especially on farms, when it would be desirable to drive some power apparatus by the power available from an automobile or truck. In fact, there have already been some power take-off devices, and many proposals therefor, in which one or both of the rear wheels of a car would drive a pulley around which a belt could be passed to drive the power equipment.

The power take-off device which has been most practical in the past has probably been a pulley carried rigidly by the rear wheel. This has been objectionable because either it was not removable or it could not very readily be removed and again attached with perfect centering. Accordingly, its use has practically necessitated leaving the pulley on the wheel at all times, and this has been objectionable from the standpoint of normal use of the automobile. The various proposals for avoiding the fixed pulley by having the tread of the tire drive a drum on a shaft which also carried a pulley have failed to make a satisfactory solution of the problem. They have been either too expensive, too awkward to use, or sometimes completely impractical.

According to the present invention a thoroughly practical power take-off device has been developed which is both inexpensive and easy to operate. The car is backed into position with one rear wheel approximately against a drum, at which time its axle is over a jack forming part of the apparatus. As the jack is operated it not only raises the wheel but draws the car backwards so that the wheel will be in a predetermined position for engaging the drum. The pressure on the drum can be regulated by slight adjustments of the jack, it being desirable that there be just enough pressure of the tire on the drum to prevent slippage. Any extra pressure results in flexing the tire unnecessarily and in unnecessarily loading the bearings of the drum. By avoiding any unnecessary flexing of the tire, power is conserved and overheating of the tire is prevented. By minimizing the load on the bearings it is possible to use inexpensive bearings.

Additional objects and advantages of the invention will be apparent from the following description and from the drawings in which:

Fig. 1 is a side view of the apparatus of this invention showing its cooperation with an automobile and with a driven pulley.

Fig. 2 is a rear view of the apparatus seen in Fig. 1.

Fig. 3 is a top view of the apparatus seen in Fig. 1.

Fig. 4 is a fragmentary vertical sectional view taken approximately on the line 4—4 of Fig. 3.

Fig. 5 is a fragmentary view taken approximately on the line 5—5 of Fig. 2.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description

In the form of the invention chosen for illustration, the power take-off apparatus includes a main base 11 by which a drum 12 is rotatably carried. The drum 12 is to be driven by a rear wheel 13 of a motor vehicle, such as a passenger automobile. For this purpose the wheel 13 is properly positioned by a jack 14 which engages the axle housing 16 of the automobile.

Positioning the wheel

In order to position the wheel 13 properly against the drum 12 the car is backed up with the wheel 13 running onto the base 11 and striking or approximately striking drum 12.

The jack which of course will have been lowered will now be operated by turning handle 17 to raise the jack. The jack is provided with a head 18, including a portion 19 which is inclined downwardly and toward the drum 12. As the jack is initially raised the axle housing 16 will first be engaged by the inclined portion 19 near the upper end thereof which is seen at the left in Fig. 1. As the jack continues to be raised the axle housing 16 will slide down the inclined portion 19 until it comes to rest in the bottom of the V formed by the head 18, thus, the other leg 21 of the V may be regarded as a stop means for stopping the axle housing 16 as it slides down the incline 19.

It will be understood that the car should be on level ground and that the brakes should be off so that the car can move to accommodate the axle housing 16 to the V-shaped head 18. A jack with a head which does not pivot is preferred.

By raising or lowering the jack 14, the wheel 13 will be raised and lowered along a vertical path. It should be raised until it is free of the drum 12, and then slowly lowered onto the drum 12 until it bears thereon just firmly enough to turn the drum 12 without slippage. Of course, in determining this, the load or power apparatus to be driven should be connected to the drum 12 as by means of a belt 23 which extends around a drive pulley 26, which would be carried by the power apparatus.

There are two advantages in lowering the wheel just enough to reliably drive the drum 12. One advantage is that the tire 13 will then be depressed very slightly at the point of its engagement with the drum 12. Accordingly, there will be very little flexing of the tire. Flexing of the tire is undesirable because it makes the rotation of the parts more difficult so that there is a very little friction loss. In addition, the tire can be excessively heated by excessive flexing. If the full weight of the car rested on the drum 12, the tire would be flexed more than in running on an ordinary surface, much as a tire is flexed in running over a curb.

Another advantage in avoiding resting much of the weight of the car on the drum 12 is that it avoids bearing trouble in connection with the drum 12 and permits the use of inexpensive bearings. It will be understood that the drum 12 may be driven at fairly high speed. Such high speeds, while carrying a heavy weight, such as one-quarter the weight of a car, would quickly injure bearings which were not adapted to such service. Indeed, it is apparent, upon reflection, that the bearings would have to be incomparable to the bearings on the wheel 13 and these are conventionally fairly expensive bearings. Although the weight applied by the wheel to the drum 12 is divided between bearings at the two ends thereof, the rotative speed of the drum 12 is much higher than the wheel 13 because the drum is smaller.

Mounting of drum

Although the details with respect to the mounting of the drum may be widely varied, it is preferred that while quantities remain small, fairly standard parts will be used. Accordingly, the drum may be fast on a shaft 28 which extends through pillow blocks 29, the pillow block being a standard form of bearing unit. The bearing preferably is of the roller type, such as a ball bearing unit. The pulley 24 is carried by the shaft 28 that is fast thereon. Usually it will be removable by loosening set screws so that pulleys of different sizes may be used for different work.

The pillow blocks 29 may be positioned on studs 31 by means of nuts threaded to each stud. The studs may conveniently be standard bolts.

As the base construction is being made in small quantities, it is preferred that it be made up of angle irons or channel irons substantially as shown. The downwardly extending legs 33 of the irons dig into ground and secure the base firmly against slipping along the ground. The various angle irons of base 11 seen in Fig. 3 may be welded together.

The jack 14 is provided with an auxiliary base 36 to which the standard base 37 of a conventional jack may be secured. The base 36 includes similarly welded angle irons and an end plate 35 which prevents longitudinal slippage on the ground. The jack 14 and its base 36 are preferably secured to the main base 11 in a manner to be adjusted toward and from the base 11, different adjustments being most convenient for different cars. It is necessary that the jack and main base 11 be rigidly secured together during use because it is the weight of the car on the jack pressing the jack base 36 and the main base 11 into or onto the ground which holds the main base 11 steady, so that it does not move under the tension of the belt 23 or as the result of the forces applied to it by the wheel 13.

A convenient manner of adjustably securing the jack 14 is seen best in Figs. 3 and 5. Here it is seen that a bar 41 lies between the base 36 and the conventional jack base 37. It is clamped tightly between the bases 36 and 37 by nuts and bolts 42.

Upon loosening the nuts and bolts 42, the jack may be slid along the bar 41, the movement being guided by blocks 43 which engage the bar 41 with a running fit so as to prevent any canting movement of the jack and its base with respect to the bar 41. Of course, the blocks 43 are slightly thinner than the bar 41 so that tightening the nuts and bolts 42 will cause a clamping of the bar 41 rather than setting the upper base 37 on the blocks 43.

It is at present also desired to have the jack 14 adjustable forwardly and rearwardly so as to adjust its spacing from the axis of drum 12. A convenient manner of providing this adjustment is seen in Figs. 3 and 4. Here it is seen that the bar 41 extends between the side portions of the main frame 11 and straps 46. Nuts and bolts 47 draw the straps 46 down to clamp the bar 41 between the straps 46 and the base 11. Because the sides of the base are made up of two angle irons, it is very easy to leave a slot 48 between the angle irons through which the bolts 47 may pass and along which they may move when they have been loosened.

It will be observed that the base 36 of the jack extends far forward and to the rearward of any part of the jack head 18. It is obvious, therefore, that the entire jack head is well within the zone of stability of the jack. In other words, it is far enough within the transverse vertical planes through the end of the jack base so that neither the weight of the car nor its coaction with the jack head tends to tip the jack, if the jack is on level ground. It is desirable that when the axle 16 is seated at the bottom of the V formed by the jack head, the sloping of a line from the axis of the axle 16 to either end of the base 36 be at least 25° and preferably about 45° from the vertical. Thus, there will be no danger that a heavy load on the pulleys 24 and 26 will result in their being enough thrust on the idle rear wheel of the car to tip the jack. It will be understood that the bases 11 and 36 may be regarded as a single base. In fact, they will function as a single base during use. If it is found that a single positioning of the jack with respect to the drum 12 will be satisfactory for a large number of makes of automobiles, the use of a single rigid base, without adjustability, for both the drum 12 and the jack may be desirable. At the present time, however, the adjustability indicated is greatly preferred.

It will be observed that a conventional type of jack is used. This is desirable for economy because conventional jacks are made in sufficient quantities to be of reasonable cost. It is also desirable from an operating standpoint because any of the conventional types of jacks have adequate range of movement and require only a reasonable manual operating force.

From the foregoing it is seen that a very inexpensive but highly dependable and easily applied form of power take-off device has been devised which is entirely suitable for use in driving power equipment by a wheel of a motor vehicle.

I claim:

1. Power take-off apparatus including a base, adapted to rest in the vicinity of one wheel only of a motor vehicle, a drum rotatably carried by the base and disposed to be engaged by the tire on said wheel, a pulley mounted to rotate with the drum for driving a belt, a conventional type of jack carried by the base and including a head, the upper surface of which includes a seat portion on which the axle of a car comes to rest and a portion forwardly thereof which is inclined downwardly and rearwardly toward the seat portion and the drum and is sturdily constructed to engage the axle of a car near the one wheel only and draw it rearwardly by a sliding movement along said sloping portion as the jack is raised, said head including stop means for limiting the rearward movement of the axle so that continued operation of the jack will raise or lower the axle to adjust the pressure of the tire on the drum; the entire inclined portion of the jack head being positioned within the zone of stability of the support for the jack, and jack operating means accessible from a position adjacent to the vehicle on the jack.

2. Power take-off apparatus including a base, adapted to rest in the vicinity of one wheel only of a motor vehicle, a drum rotatably carried by the base and disposed to be engaged by the tire on said wheel, a pulley mounted to rotate with the drum for driving a belt, a conventional type of jack carried by the base and including a head, the upper surface of which includes a seat portion on which the axle of a car comes to rest and a portion forwardly thereof which is inclined downwardly and rearwardly toward the seat portion and the drum and is sturdily constructed to engage the axle of a car near the one wheel only and draw it rearwardly by a sliding movement along said sloping portion as the jack is raised, said head including stop means for limiting the rearward movement of the axle so that continued operation of the jack will raise or lower the axle to adjust the pressure of the tire on the drum; the entire inclined portion of the jack head being positioned within the zone of stability of the support for the jack, and jack operating means accessible from a position adjacent to the vehicle on the jack, said jack being adjustable with respect to the drum in a forward and rearward direction and also in a lateral direction.

3. Power take-off apparatus including a base adapted to rest in the vicinity of one wheel only of a motor vehicle, a drum rotatably carried by the base and disposed to be engaged by the tire on said wheel, a pulley mounted to rotate with the drum for driving a belt, a conventional type of jack carried by the base and including a non-pivotal head, the upper surface of which includes a seat portion on which the axle of a car comes to rest and a portion forwardly thereof which is inclined downwardly and rearwardly toward the seat portion and the drum and is sturdily constructed to engage the axle of a car near the one wheel only and draw it rearwardly by a sliding movement along said sloping portion as the jack is raised, said head including stop means for limiting the rearward movement of the axle so that continued operation of the jack will raise or lower the axle to adjust the pressure of the tire on the drum, the axle-seat being positioned ahead of the drum less than the radius of a wheel for which the apparatus is designed; the entire inclined portion of the jack head being positioned within the zone of stability of the support for the jack, and jack operating means accessible from a position adjacent to the vehicle on the jack.

4. Power take-off apparatus including a base adapted to rest in the vicinity of one wheel only of a motor vehicle, a drum rotatably carried by the base and disposed to be engaged by the tire on said wheel, a pulley mounted to rotate with the drum for driving a belt, a conventional type of jack carried by the base and including a non-pivotal head, the upper surface of which includes a seat portion on which the axle of a car comes to rest and a portion forwardly thereof which is inclined downwardly and rearwardly toward the seat portion and the drum and is sturdily constructed to engage the axle of a car near the one wheel only and draw it rearwardly by a sliding movement along said sloping portion as the jack is raised, said head including stop means for limiting the rearward movement of the axle so that continued operation of the jack will raise or lower the axle to adjust the pressure of the tire on the drum; the entire inclined portion of the jack head being positioned within the zone of stability of the support for the jack, and jack operating means accessible from a position adjacent to the vehicle on the jack, said base being formed of metal stock angular in cross-section with one flange extending downwardly to dig into the ground to prevent slipping.

5. Power take-off apparatus including a base adapted to rest in the vicinity of one wheel only of a motor vehicle, a drum rotatably carried by the base and disposed to be engaged by the tire on said wheel, a pulley mounted to rotate with the drum for driving a belt, a jack carried by the base and having an axle-seat positioned ahead of the drum less than the radius of a wheel for which the apparatus is designed and having a sturdy portion with an inclined slide surface extending upwardly from the seat in a direction away from the axis of the drum to slide an axle toward the drum onto the seat and jack-operating means accessible from a position adjacent to the vehicle on the jack; said jack being of a type which is capable of supporting the axle while the jack is at rest at heights varying infinitesimally whereby the pressure of the wheel on the drum can be varied delicately by operation of the jack.

6. Power take-off apparatus including a base adapted to rest in the vicinity of one wheel only of a motor vehicle, a drum rotatably carried by the base in fixed position with respect to the base during use of the apparatus and disposed to be engaged by the tire on said wheel, the base forwardly of the drum being substantially unobstructed to receive a wheel backed from in front of the base to engage the drum, a pulley mounted to rotate with the drum for driving a belt, a vertically acting jack carried by the base in fixed position with respect to the base during use of the apparatus and having an axle-seat, and having a sturdy portion with an inclined slide surface extending upwardly from the seat in a fixed direction away from the axis of the drum so that, if the jack is positioned so close to the axis of the drum that in backing a car into position for its wheel to be raised the wheel will strike the drum before the axle is over the seat, the jack upon being raised and raising the axle will slide the axle rearwardly to the seat, thus positioning the wheel to be lowered upon the drum, and jack-operating means accessible from a position adjacent to the vehicle on the jack; said jack being of a type which is capable of supporting the axle while the jack is at rest at heights varying infinitesimally whereby the pressure of the wheel on the drum can be varied delicately by the operation of the jack.

ALEXANDER JAY LEWUS.

REFERENCES CITED

The following references are of record in the file of this patent:

UNITED STATES PATENTS

| Number | Name | Date |
| --- | --- | --- |
| 1,211,033 | Andersen | Jan. 2, 1917 |
| 1,309,481 | Koger | July 8, 1919 |
| 1,342,649 | Saltzman | June 8, 1920 |
| 1,353,178 | Owen | Sept. 21, 1920 |
| 1,368,943 | Korner et al. | Feb. 15, 1921 |
| 1,623,765 | Warren, Jr. | Apr. 5, 1927 |
| 2,000,503 | White | May 7, 1935 |
| 2,458,590 | Harris et al. | Jan. 11, 1949 |

FOREIGN PATENTS

| Number | Country | Date |
| --- | --- | --- |
| 794,772 | France | Dec. 26, 1935 |